US011802197B2

(12) United States Patent
DuPont et al.

(10) Patent No.: US 11,802,197 B2
(45) Date of Patent: Oct. 31, 2023

(54) FOOD PRODUCT CONTAINER AND COMPOSITION FOR SAME

(71) Applicant: Nypro Inc., Clinton, MA (US)

(72) Inventors: Aaron DuPont, Mebane, NC (US); Keith Poole, Hillsborough, NC (US); Doug Bengtson, Greensboro, NC (US); Eric Paszkowski, Holden, MA (US)

(73) Assignee: NYPRO INC., Clinton, MA (US)

( * ) Notice: Subject to any disclaimer, the term of this patent is extended or adjusted under 35 U.S.C. 154(b) by 0 days.

(21) Appl. No.: 15/739,373

(22) PCT Filed: Jun. 23, 2016

(86) PCT No.: PCT/US2016/038921
§ 371 (c)(1),
(2) Date: Dec. 22, 2017

(87) PCT Pub. No.: WO2016/210067
PCT Pub. Date: Dec. 29, 2016

(65) Prior Publication Data
US 2018/0186985 A1 Jul. 5, 2018

Related U.S. Application Data

(60) Provisional application No. 62/185,300, filed on Jun. 26, 2015.

(51) Int. Cl.
C08L 23/14 (2006.01)
C08K 3/22 (2006.01)
(Continued)

(52) U.S. Cl.
CPC ............ C08L 23/14 (2013.01); B32B 1/02 (2013.01); B32B 3/04 (2013.01); B32B 7/12 (2013.01);
(Continued)

(58) Field of Classification Search
CPC ..................................... C08L 23/14
See application file for complete search history.

(56) References Cited

U.S. PATENT DOCUMENTS 5,298,326 A * 3/1994 Norpoth ............... B32B 27/08
428/349
8,530,012 B2 9/2013 Siegel et al.
(Continued)

FOREIGN PATENT DOCUMENTS

EP 0161035 A2 11/1985
EP 0456327 A2 11/1991
(Continued)

OTHER PUBLICATIONS

EP Application No. 16815265.0 filed Jun. 23, 2016; European Search Report dated Jan. 14, 2019; 6 pages.
(Continued)

Primary Examiner — Michael F Pepitone
(74) Attorney, Agent, or Firm — CANTOR COLBURN LLP

(57) ABSTRACT

A composition for a food product storage container includes a polypropylene co-polymer, a tie additive, a color concentrate, and Ethylene vinyl alcohol. The ethylene vinyl alcohol may be between 3 and 10% by weight of the food product storage container. The composition further comprises small particle talc. The composition may be configured to be co-injection molded to form the food product storage container which may reduce an ingress of moisture and/or oxygen.

28 Claims, 3 Drawing Sheets

(51) Int. Cl.

| | |
|---|---|
| *C08L 51/06* | (2006.01) |
| *B32B 27/08* | (2006.01) |
| *B32B 7/12* | (2006.01) |
| *B32B 27/32* | (2006.01) |
| *B32B 3/04* | (2006.01) |
| *B32B 1/02* | (2006.01) |
| *B32B 27/20* | (2006.01) |
| *B32B 27/30* | (2006.01) |
| *B65D 25/14* | (2006.01) |
| *B65D 81/24* | (2006.01) |

(52) U.S. Cl.
CPC .............. *B32B 27/08* (2013.01); *B32B 27/20* (2013.01); *B32B 27/306* (2013.01); *B32B 27/32* (2013.01); *B65D 25/14* (2013.01); *B65D 81/24* (2013.01); *C08K 3/22* (2013.01); *C08L 51/06* (2013.01); *B32B 2250/03* (2013.01); *B32B 2250/246* (2013.01); *B32B 2264/102* (2013.01); *B32B 2307/4026* (2013.01); *B32B 2307/7244* (2013.01); *B32B 2439/40* (2013.01); *B32B 2439/70* (2013.01); *C08K 2003/2241* (2013.01); *C08L 2201/14* (2013.01); *C08L 2203/10* (2013.01); *C08L 2203/16* (2013.01); *C08L 2205/025* (2013.01)

(56) References Cited

U.S. PATENT DOCUMENTS

2001/0038897 A1  11/2001  Curie et al.
2013/0084367 A1  4/2013   Caldwell et al.
2014/0199505 A1  7/2014   Lorenzetti et al.

FOREIGN PATENT DOCUMENTS

| EP | 1273425 A1 | 1/2003 | |
|---|---|---|---|
| JP | H0770378 A | 3/1995 | |
| WO | 9311175 A1 | 6/1993 | |
| WO | 03035368 A1 | 5/2003 | |
| WO | WO-2010034515 A1 * | 4/2010 | ............ B32B 27/20 |

OTHER PUBLICATIONS

International Preliminary Report on Patentability for International Application No. PCT/US2016/038921, International Filing Date Jun. 23, 2016, dated Jan. 4, 2018, 12 pages.

International Search Report and Written Opinion for International Application No. PCT/US2016/038921, International Filing Date Jun. 23, 2016, dated Oct. 10, 2016, 16 pages.

Kuraray Co. Ltd., "Database WPI Week 199519 Thomson Scientific, London, GB; AN 1995-144868 & JP H0770378 A," Mar. 14, 1995, Abstract and paragraphs [0022] and [0028], pp. 1-2.

Communication pursuant to Article 94(3) EPC; International Application No. 16815265.0-1102; International Filing Date: Jan. 6, 2018; dated Feb. 8, 2021; 5 pages.

* cited by examiner

FOOD PRODUCT CONTAINER AND COMPOSITION FOR SAME

PRIORITY

This patent application claims priority from U.S. patent application No. 62/185,300, filed Jun. 26, 2015, entitled, "Food Product Container and Composition for Same," naming Aaron DuPont, Keith Poole, Doug Bengtson, and Eric Paskowski as inventors, the disclosure of which is incorporated herein, in its entirety, by reference.

TECHNICAL FIELD

The present invention relates to food product containers, and more particularly to compositions for producing food product containers.

BACKGROUND ART

Many food products such as fruit, coffee, yogurt, among others, are stored in sealed containers to help maintain the freshness of the food product. However, despite being in sealed container, in some instances, oxygen and moisture may penetrate the container and/or seal. This, in turn, may negatively impact the quality and the freshness of the food product within the container.

SUMMARY OF THE EMBODIMENTS

In accordance with one embodiment, a composition for a food product storage container includes a polypropylene co-polymer, a tie additive, a color concentrate, and Ethylene vinyl alcohol. The Ethylene vinyl alcohol may be between 3 and 10% (e.g., 8%) by weight of the food product storage container, and the polypropylene co-polymer may be between 77 and 93% (e.g., 83.26%) by weight of the food product storage container. In some embodiments, the tie additive may be between 3 and 10% (7.36%) by weight of the food product storage container, and the color concentrate may be between 1 and 3% (e.g., 1.38%) by weight of the food product storage container.

In additional embodiments, the tie additive may be an anhydride-modified polypropylene resin and/or Bynel 50E803C, and the color concentrate may be Clariant CPPRO2096. The polypropylene copolymer, the tie additive, and the color concentrate may form at least one of an inside skin layer and an outside skin layer of the food product storage container. The Ethylene vinyl alcohol may form an inner layer of the food product storage container, and the inner layer may be located at least partially between the inside skin layer and the outside skin layer. For example, the inner layer may be a barrier layer configured to reduce oxygen ingress into the food product storage container. The composition may be configured to be co-injection molded to form the food product storage container.

In accordance with further embodiments, a composition for a food product storage container includes a polypropylene co-polymer, a color concentrate, Ethylene vinyl alcohol, and a tie additive that is between 3 and 10% (e.g., 7.36%) by weight of the food product storage container. In some embodiments, the polypropylene co-polymer may be between 77 and 93% (e.g., 83.26%) by weight of the food product storage container, the color concentrate may be between 1 and 3% (e.g., 1.38%) by weight of the food product storage container, and the Ethylene vinyl alcohol may be 8% by weight of the food product storage container.

The tie additive may be an anhydride-modified polypropylene resin and/or Bynel 50E803C. The color concentrate may be Clariant CPPRO2096.

In some embodiments, the polypropylene copolymer, the tie additive, and the color concentrate may form an inside skin layer and/or an outside skin layer of the food product storage container, and the Ethylene vinyl alcohol may form an inner layer of the food product storage container. The inner layer may be located at least partially between the inside skin layer and the outside skin layer. The inner layer may be a barrier layer configured to reduce oxygen ingress into the food product storage container. The composition may be configured to be co-injection molded to form the food product storage container.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, a food product storage container may include a layer of barrier material located between two outer skin layers. In this manner, some embodiments of the present invention may reduce/prevent the ingress of moisture and/or oxygen into the food product container, which can negatively impact the food product stored within the container. Details of illustrative embodiments are discussed in greater detail below.

Figure 1B:
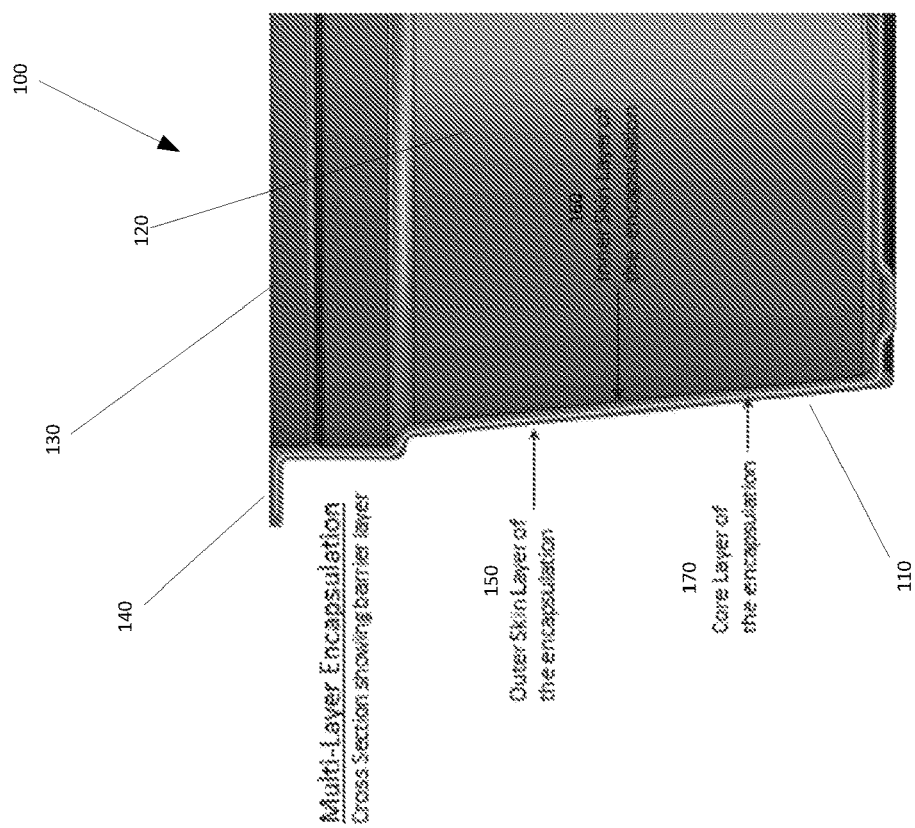
FIG. 1B schematically shows a portion of cross-section of the food product storage container of FIG. 1A along line A-A in accordance with some embodiments of the present invention.
Figure 1A:
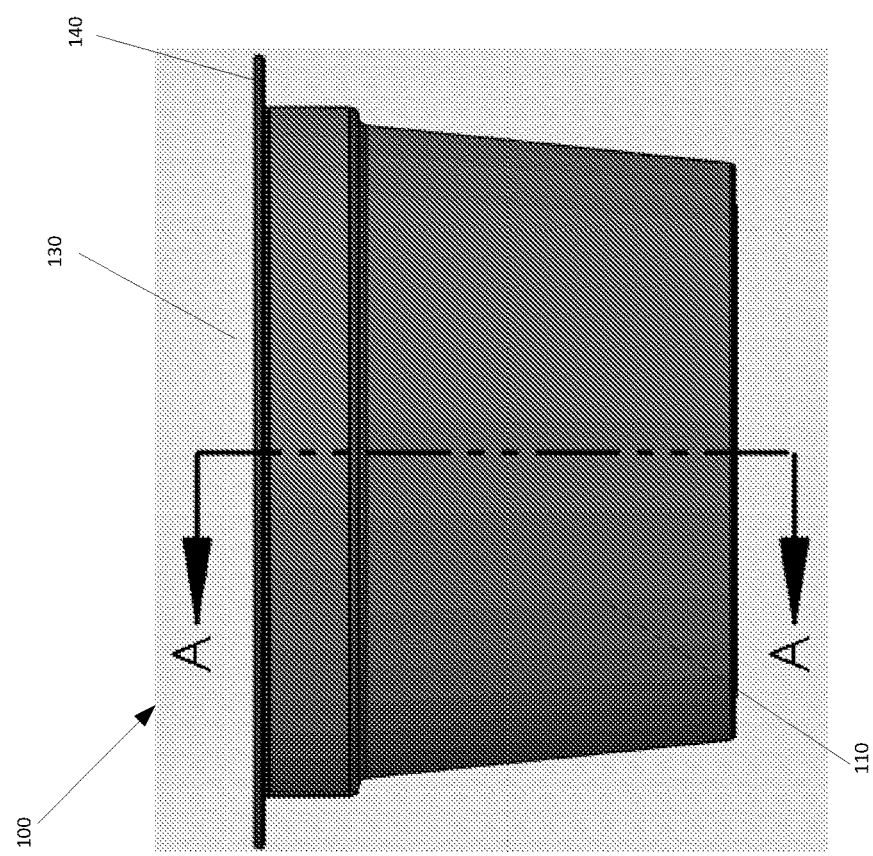
FIG. 1A schematically shows a food product storage container in accordance with some embodiments of the present invention.

FIG. 1A schematically shows a food product storage container 100 in accordance with some embodiments of the present invention. FIG. 1B schematically shows a cross-sectional view of a portion of the food product storage container 100 shown in FIG. 1A. The container 100 may have wall 110 that defines an inner volume 120 in which the food product may be stored. Additionally, to facilitate the introduction of the food product into the container 100, the container may include an open top 130. Once the food product is introduced into the food product container 100, a cover (not shown) may be placed over the open top 130 to close the container 100. For example, the cover may be a piece of thin aluminum (e.g., aluminum foil) that is sealed to a flange 140 that extends around the periphery of the upper end of the container 100.

As best shown in FIG. 1B, the wall 110 of the container 100 can be formed from multiple layers of material. For example, the wall 110 can include an outer skin layer 150 that is exposed to the atmosphere, an inner skin layer 160 that is exposed to (and will contact) the food product stored within the container 100, and a barrier/core layer 170 located between the outer skin layer 150 and inner skin layer 160. The thicknesses of the wall 110 and the individual layers (e.g., outer skin layer 150, inner skin layer 160 and barrier/core layer 170) may vary depending on the specific application. However, in some embodiments, the wall 110 may be between 0.38 mm and 0.55 mm thick, the outside skin layer 150 may be between 0.09 mm and 0.22 mm thick, the inner skin layer 160 may be between 0.09 mm and 0.3 mm thick, and the barrier/core layer 170 may be between 0.025 and 0.050 mm thick. As discussed in greater detail below, the inner and outer skin layers 150/160 may be formed from the same material. Additionally, because the inner skin layer 160 may come into contact with the food product, it should be formed from a material that is compatible with and approved for use with food products (e.g., a polypropylene co-polymer).

To further protect against oxygen and moisture ingress into the container 100, in some embodiments, the core/barrier layer 170 may be fully encapsulated by the inner and outer skin layers 150/160 such that no portion of the core/barrier layer 170 is exposed to the atmosphere and/or the inner volume 120 of the container 100. Additionally, to provide sufficient overlap and barrier protection with the cover/lip once the cover is applied, the core/barrier layer 170 may extend around the entire container 100 and into the flange 140. As discussed in greater detail below, the core/barrier layer 170 may be located along the center line of the wall 110. Alternatively, the core/barrier layer 170 may be offset from the center line. For example, the core/barrier layer 170 may be closer to the inner volume 120 of the container 100 or closer to the outer surface of the container 100.

Figure 2:
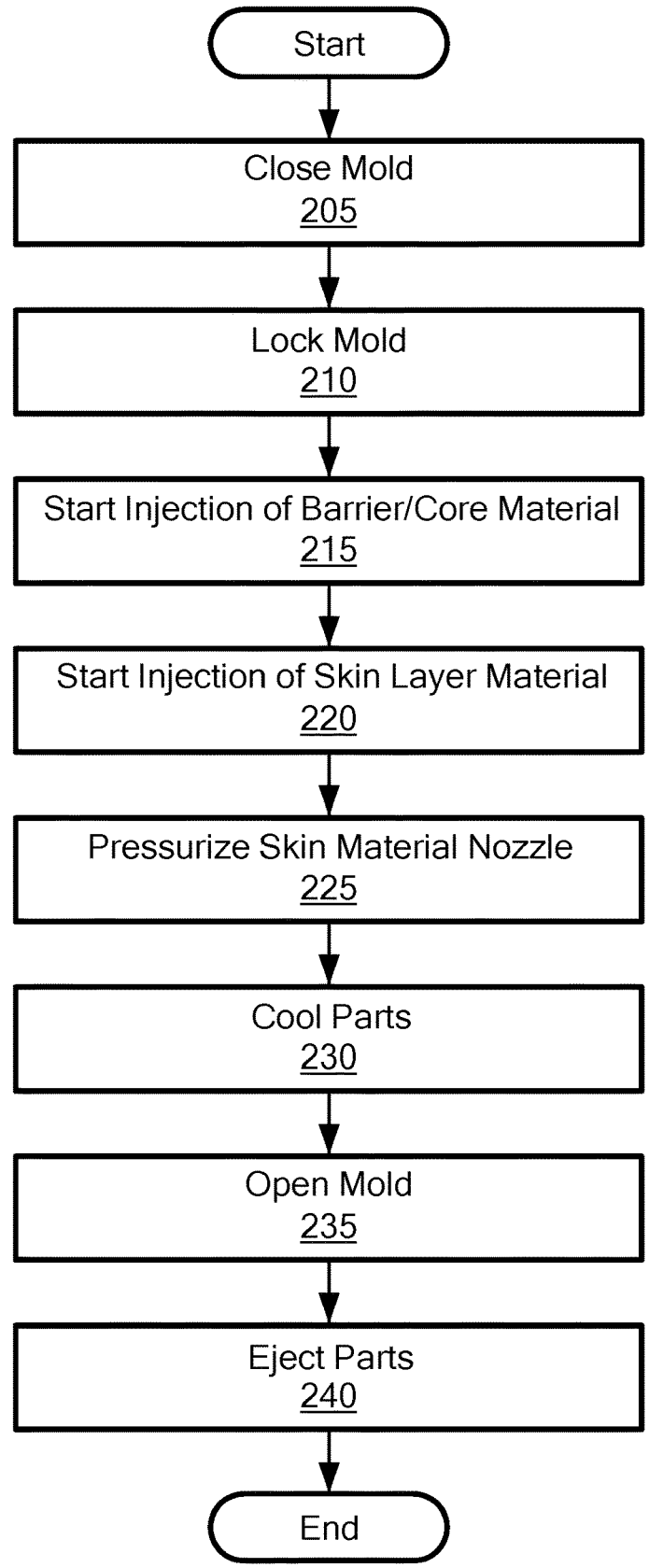
FIG. 2 is a flow chart depicting a method of manufacturing the food product storage container shown in FIG. 1A, in accordance with some embodiments of the present invention.
Figure 3:
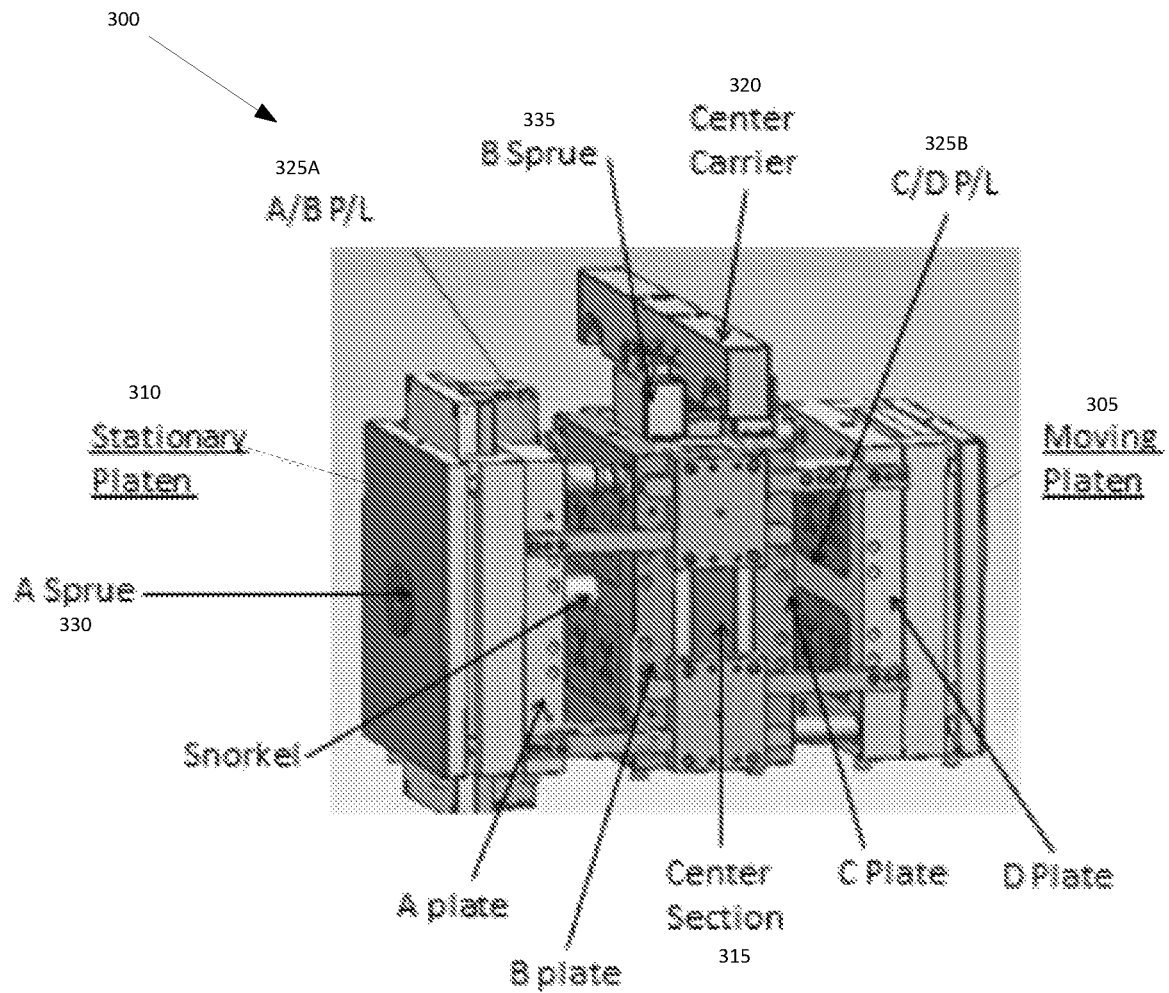
FIG. 3 schematically shows a mold used in the manufacturing of the food product storage container shown in FIG. 1A, in accordance with some embodiments of the present invention.

Several manufacturing processes can be utilized to produce the food product container 100 shown in FIGS. 1A and 1B. However, in preferred embodiments, the container 100 is made using a co-injection molding process. FIG. 2 is a flow chart showing an exemplary co-injection process 200 used to produce the container 100, and FIG. 3 schematically shows an exemplary mold 300 used to form the container 100. As shown in FIG. 3, the mold 300 may be a stack mold with multiple parting lines 325A/B. For example, the mold may have an A/B parting line 325A and a C/D parting line 325B. At the start of the co-injection molding process 200, the user may close the mold 300 (Step 205) until the parting lines of the mold 300 (e.g., parting lines 325A/B) are touching (e.g., mold touch) but no tonnage is applied (e.g., such that the molding machine does not apply force to the moving platen 305). For example, as the mold 300 closes, a moving platen 305 may move towards a stationary platen 310. As this happens, a center section 315, which is not attached to a platen, also moves toward the stationary platen 310. However, the center section 315 moves at half the speed, acceleration, and distance of the moving platen 315 via the use of a centering device 320.

Once the mold is closed, the user may lock the mold 300 (Step 210) using a mold lock (not shown). During locking, shut-off nozzles (e.g., a valve nozzle within the nozzle tip of an injection unit that closes the flow path to prevent drooling or leaking of material) within the injection units of the molding machine are opened and the molding machine begins to apply force to the moving platen 305 (e.g., the molding machine begins to build the tonnage). This force applied to the moving platen 305 is translated to the parting lines 325A/B to keep the system closed. The system will continue to apply the force until the desired/specified force/tonnage is reached. Building the tonnage in this manner also builds a contact force on a first barrel injection nozzle (not shown). As discussed in greater detail below, the first barrel injection nozzle located in sprue 330 is used to inject the skin layers 150/160, and a second barrel injection nozzle located in sprue 335 is used to inject the barrier/core layer 170 of the container 100.

The user/molding machine may then initiate the injection profile for the second barrel injection nozzle to begin the flow of the barrier/core layer material (Step 215). This step may be performed in line with a mold lock, and a delay timer may be used to delay the start of the first barrel injection profile (e.g., to delay the start of the injection of the skin layers 150/160 using the first barrel injection nozzle). When the appropriate delay has passed, the user/molding machine may then initiate the injection profile for the first barrel injection nozzle (Step 220) to begin the flow of the outer and inner skin layer material. As the outer and inner skin layer material begins to flow, the molding machine will begin to inject three layers of material into the mold 300. The outer and inner skin layers 150/160 will be on the outside and inside, respectively, and the barrier/core layer 170 will be between the outer and inner skin layers 150/160. In some embodiments, in order to get the layers to flow uniformly through the mold 300 and create a uniform wall thickness, the molding machine may adjust the flow rates of the materials (e.g., the rates of the injection screws) such that the flow rate of the skin layer material and the flow rate of the barrier/core layer material are the same within the mold 300.

As mentioned above, the barrier/core layer 170 may be located on the centerline of the container wall 110 or may be off-set from the centerline of the wall 110. To that end, the user/molding machine may adjust various parameters of the injection molding process to obtain the desired location of the barrier/core layer 170.

After the flow of material is complete and the mold 300 is full, the user/molding machine may then pressurize the feed screw on the first nozzle (Step 225) to pressurize the melt in the mold 300, and allow the parts to cool (Step 230). As the containers 100 begin to cool within the mold 300, they will begin to solidify via conduction on the core side of the mold 300 and convection and conduction on the cavity side of the mold 300. After the cooling is complete, the user/molding machine may then open the mold 300 (Step 235) and eject the parts/containers 100 from the mold 300 (Step 240). For example, in some embodiments, when the mold 300 opens, the mold machine/system may send a signal that instructs a robot to retrieve the parts from the mold faces. In such embodiments, as the robot approaches the mold 300, the robot (or an automation cell) sends a permission signal to the molding machine (e.g., to the molding machine core function which is a powered function outside of the core mechanical functions of the injection molding press) to allow actuation of a mold ejector. The mold ejector then actuates to eject the parts into an end of arm tool on the robot. The mold ejector may advance and return per the programming of the molding machine core function, and once all of the parts are retrieved by the robot, the molding machine may close the mold 300 (e.g., in response to a signal received from the robot/automation cell) to prepare for the next cycle.

As mentioned above, the molding machine core function is a powered function in the mold 300 that operates outside of the mechanical functions of the injection molding press. To that end, the core function may be powered by hydraulics, pneumatics, and/or servo motors. Additionally, there may be numerous and varied control inputs for the core function(s) (e.g., pressure, time, flow, volts, amps, velocity, position, etc.). For example, in some embodiments, the core function is an ejection cylinder in the mold 300 that is operated by hydraulics and controlled by pressure, time, and position. The permissions of the ejection cylinder may be controlled by the automation cell.

In some embodiments, the skin layers (e.g., the outer skin layer 150 and the inner skin layer 160) can be a polypropylene copolymer (e.g., PP 4820WZ from Total Petrocemicals), and the barrier/core layer 170 may be Ethylene vinyl alcohol (EVOH) (e.g., Soarnal DC3212B from Nippon Gohsei). Although any number of types/grades of polypropylene copolymer and EVOH may be used, in some embodiments, an EVOH may be selected that has a similar viscosity to that of the polypropylene copolymer used for the outer and/or inner skin layers 150/160. Using an EVOH with a viscosity similar to that of the polypropylene copolymer may aid in coinjection molding.

In addition to the polypropylene copolymer, some embodiments of the present invention may utilize additional components to achieve the desired/required container characteristics. For example, polypropylene copolymer and EVOH do not naturally adhere to one another. Therefore, in embodiments using a polypropylene copolymer for the outer and inner skin layers 150/160 and EVOH for the barrier/core layer 170, an adhesive (e.g., a tie additive) may be used to promote the bonding between the three layers (e.g., the outer skin layer 150, the barrier/core layer 170, and the inner skin layer 160) of the container 100. In particular, some embodiments may utilize an anhydride-modified polypropylene resin and/or a polypropylene with maleic anhydride grafted to the polypropylene ("PP") chain side groups at high density (e.g., Bynel 50E803C from Dupont).

It is important to note that the injection molding processes and the high shear rate levels between the polymer chains can produce retained static in the finished molded part (e.g., in the container 100). This charge induction increases with the rate of filling in the cavity (e.g., the flow rates of the skin layers 150/160 and the barrier/core layer 170). In ultra-thin wall applications such as many food product storage containers, extremely high fill rates may be needed. These high fill rates generate large shear rates, and thus higher charge induction in the melt and finished container 100. Many polymers attempt to counter this shear rate effect and the resultant charge induction by including an antistatic additive in the polymer.

Most types of antistatic additives used in PP manufacture have the same chemical mechanism. Thus, they will react with the same type of molecules regardless of their slightly different chemical make ups. As such, the maleic anhydride contained within the tie additive used in some embodiments of the present invention may react with the antistatic agents contained within the polypropylene copolymer. This, in turn, reduces the effective level of antistatic available to counter the charge generation discussed above, and the availability of active maleic anhydride side groups to promote the bonding between the layers of the container 100. To that end and to address the reductions in available antistatic additive and active maleic anhydride, some embodiments of the present invention may balance the above competing performance metrics such that an acceptable layer adhesion is achieved and charge generation is kept at an acceptable level.

It should also be noted that the thin nominal wall thickness and the multi-layered nature of various embodiments of the present invention may further weaken the integrity and structure of the wall sections. Additionally, many polypylene types tend to become very brittle when molded into form factors that are thin, especially when the high shear rates experienced during cavity filling align the molecular chains of the polymer and the part is rapidly cooled (which freezes the molded in stress). In some embodiments, it may be important that the side wall of the container 100 be strong enough to avoid collapse, yet the material be ductile enough to stretch to some degree (e.g., so that the container does no undergo brittle failure) when the container 100 is exposed to various forces. This helps to prevent the container 100 (e.g., the container wall 110) to split during use (e.g., because of the highly aligned molecular chains and molded-in stresses).

Additionally, one of the key performance metrics of a food product storage container 100 is the container's protection against moisture (e.g., the container's water vapor transmission rate, "WVTR"). The WVTR depends partly on the type of polypropylene used, and the hydrophobic nature of polypropylene (which creates a tortuous path for water molecules to pass through). In general, polypropylene homo-polymers perform better than co-polymers because a portion of the PP polymer chain contains small percentages of ethylene monomer to improve ductility and flexibility. These ethylene segments in the chain create space, and the molecular chains cannot pack as tightly together as compared to a uniform chain made exclusively on propylene monomer. This, in turn, creates internal molecular space that reduces the tortuous path and raises the WVTR. Therefore, it is important to choose a polypropylene copolymer that balances the WVTR and ductility/flexibility.

In addition to the adhesive/tie additive, some embodiments of the present invention may also include a color concentrate (e.g., a colorant). As the name suggests, the color concentrate will provide the final container 100 with a desired color. The color concentrate can provide additional benefits such as helping the layers of the container 100 bond to one another, as well as help the containers release from the mold 300 during manufacturing. Although a number of color concentrates can be used within the present invention, some embodiments use a titanium oxide colorant such as CPPRO2096 from Clariant.

Table 1 below shows the various component of the container 100, the target concentrations (% by weight) of each of the components, as well as the layer in which the component may be included.

TABLE 1

Container Components

| Component | Layer | % Weight in Finished Container | |
|---|---|---|---|
| | | Range | Exemplary Embodiment |
| Polypropylene copolymer | Outer and Inner Skin Layers | 77.00-93.00 | 83.26 |
| Adhesive/Tie Additive | Outer and Inner Skin Layers | 3.00-10.00 | 7.36 |
| Color Concentrate | Outer and Inner Skin Layers | 1.00-3.00 | 1.38 |
| EVOH | Core/Barrier Layer | 3.00-10.00 | 8 |

As shown in Table 1 above, the outer and inner skin layers 150/160 may include not only the polypropylene copolymer, but also the adhesive/tie additive and the color concentrate. In such embodiments, during molding of the container 100, the polypropylene copolymer, the adhesive/tie additive, and the color concentrate may be injected together via the first barrel injection nozzle to form the outer and inner skin layers 150/160, and the EVOH may co-injected to form the barrier/core layer 170. Additionally, as also shown in Table 1, the PP copolymer can be between 77 and 93% weight of the final container 100, the tie additive may be between 3 and 10% weight, the color concentrate may be between 1 and 3% weight, and the EVOH may be between 3 and 10% weight. For example, in some embodiments, the PP copolymer can be 83.26% weight of the final container 100, the tie additive may be 7.36% weight, the color concentrate may be 1.38% weight, and the EVOH may be 8% weight.

It is important to note that some food products may require moisture permeation protection in addition to the oxygen permeation protection provided by the barrier/core layer 170. In some instances, the skin layers 150/160 are unable to provide the level of moisture protection required for the food product (e.g., the WVTR may be too high). To that end, some embodiments may include an additional component within the skin layers 150/160 to improve moisture permeation protection (e.g., to improve the WVTR). For example, an additional component such as talc may be added to the skin layer material. The talc may have a small particle size (e.g., between 0.5 and 5.0 micron sieve) and may be lamellar in nature.

The talc may be added to the molded container 100 in a number of ways. For example, the talc may be compounded directly into a master batch of raw materials with the polypropylene copolymer, adhesive/tie additive, and color concentrate. Additionally or alternatively, the talc may be feed into the injection molding screw in powder form. In such embodiments, the talc may be added to the skin layers 150/160 via the first barrel injection nozzle.

Table 2 below shows the various component of an exemplary container having increased moisture permeation protection, the target concentrations (% by weight) of each of the components, as well as the layer in which the component may be included.

TABLE 2

Alternative Embodiment Container Components

| Component | Layer | % Weight in Finished Container | |
|---|---|---|---|
| | | Range | Exemplary Embodiment |
| Polypropylene copolymer | Outer and Inner Skin Layers | 42.30%-88.27% | 73.63% |
| Small Particle Talc 0.5-5 Micron Sieve | Outer and Inner Skin Layers | 4.50%-38.80% | 12.35% |
| Adhesive/Tie Additive | Outer and Inner Skin Layers | 2.70%-9.70% | 7.60% |
| Color Concentrate | Outer and Inner Skin Layers | 0.90%-2.91% | 1.43% |
| EVOH | Core/Barrier Layer | 3.00%-10.00% | 5.00% |

As shown in Table 2 above, the outer and inner skin layers 150/160 may include not only the polypropylene copolymer, but also the adhesive/tie additive, the talc, and the color concentrate. Additionally, as also shown in Table 2, the PP copolymer can be between 42.3 and 88.27% weight of the final container 100, the small particle talc may be between 4.5 and 38.8% weight, the tie additive may be between 2.7 and 9.7% weight, the color concentrate may be between 0.9 and 2.91% weight, and the EVOH may be between 3 and 10% weight. For example, in some embodiments, the PP copolymer can be 73.63% weight of the final container 100, the talc may be 12.35%, the tie additive may be 7.6% weight, the color concentrate may be 1.43% weight, and the EVOH may be 5% weight.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A food product storage container comprising:
   a body having an inside skin layer, an outside skin layer, and an inner layer positioned between and encapsulated by the inside skin layer and the outside skin layer, the inner layer including Ethylene vinyl alcohol and at least one of the inside skin layer and the outside skin layer including:
   a polypropylene co-polymer;
   a tie additive;
   a color concentrate; and
   wherein the Ethylene vinyl alcohol is between 3 and 10% by weight of the food product storage container.

2. A food product storage container according to claim 1, wherein the polypropylene co-polymer is between 77 and 93% by weight of the food product storage container.

3. A food product storage container according to claim 2, wherein the polypropylene co-polymer is 83.26% by weight of the food product storage container.

4. A food product storage container according to claim 1, wherein the tie additive is between 3 and 10% by weight of the food product storage container.

5. A food product storage container according to claim 4, wherein the tie additive is 7.36% by weight of the food product storage container.

6. A food product storage container according to claim 1, wherein the tie additive is an anhydride-modified polypropylene resin.

7. A food product storage container according to claim 1, wherein the color concentrate is between 1 and 3% by weight of the food product storage container.

8. A food product storage container according to claim 1, wherein the color concentrate includes titanium oxide.

9. A food product storage container according to claim 1, wherein the color concentrate is 1.38% by weight of the food product storage container.

10. A food product storage container according to claim 1, wherein the polypropylene copolymer, the tie additive, and the color concentrate form at least one of an inside skin layer and an outside skin layer of the food product storage container.

11. A food product storage container according to claim 1, wherein the inner layer is a barrier layer configured to reduce oxygen ingress into the food product storage container.

12. A food product storage container according to claim 1, wherein the composition is configured to be co-injection molded to form the food product storage container.

13. A food product storage container according to claim 1, wherein the Ethylene vinyl alcohol is 8% by weight of the food product storage container.

14. A food product storage container according to claim 1, further comprising small particle talc.

15. A food product storage container according to claim 14, wherein the small particle talc is between 4.5 and 38.8% by weight of the food product storage container.

16. A food product storage container according to claim 14, wherein the small particle talc is 12.35% by weight of the food product storage container.

17. A food product storage container comprising:
a body having an inside skin layer, an outside skin layer, and an inner layer positioned between and encapsulated by the inside skin layer and the outside skin layer, the inner layer including Ethylene vinyl alcohol and at least one of the inside skin layer and the outside skin layer including:
a polypropylene co-polymer;
a tie additive, the tie additive being between 3 and 10% by weight of the food product storage container; and
a color concentrate.

18. A food product storage container according to claim 17, wherein the polypropylene co-polymer is between 77 and 93% by weight of the food product storage container.

19. A food product storage container according to claim 18, wherein the polypropylene co-polymer is 83.26% by weight of the food product storage container.

20. A food product storage container according to claim 17, wherein the additive is 7.36% by weight of the food product storage container.

21. A food product storage container according to claim 17, wherein the tie additive is an anhydride-modified polypropylene resin.

22. A food product storage container according to claim 17, wherein the color concentrate is between 1 and 3% by weight of the food product storage container.

23. A food product storage container according to claim 17, wherein the color concentrate includes titanium oxide.

24. A food product storage container according to claim 17, wherein the color concentrate is 1.38% by weight of the food product storage container.

25. A food product storage container according to claim 17, wherein the polypropylene copolymer, the tie additive, and the color concentrate form an inside skin layer and an outside skin layer of the food product storage container.

26. A food product storage container according to claim 17, wherein the inner layer is a barrier layer configured to reduce oxygen ingress into the food product storage container.

27. A food product storage container according to claim 17, wherein the composition is configured to be co-injection molded to form the food product storage container.

28. A food product storage container according to claim 17, wherein the Ethylene vinyl alcohol is 8% by weight of the food product storage container.

* * * * *